W. LEWIS.
Straw Cutter.

No. 5,169.  Patented June 19, 1847.

UNITED STATES PATENT OFFICE.

WILLIAM LEWIS, OF EDGEFIELD COURT-HOUSE, SOUTH CAROLINA.

STRAW-CUTTER.

Specification of Letters Patent No. 5,169, dated June 19, 1847.

*To all whom it may concern:*

Be it known that I, WILLIAM LEWIS, of Edgefield Court-House, in the State of South Carolina, have invented a new and Improved Straw-Cutter; and I do hereby declare the following to be a full, clear, and exact description of the construction and operation thereof, reference being had to the accompanying drawings, making a part of this specification, in which—

Figure 1:
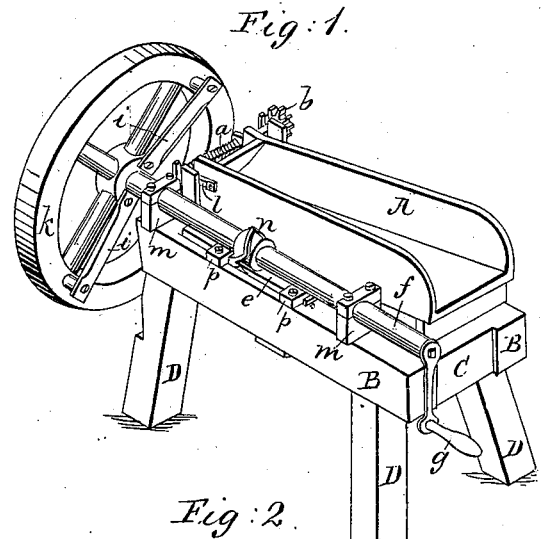
Figure 2:
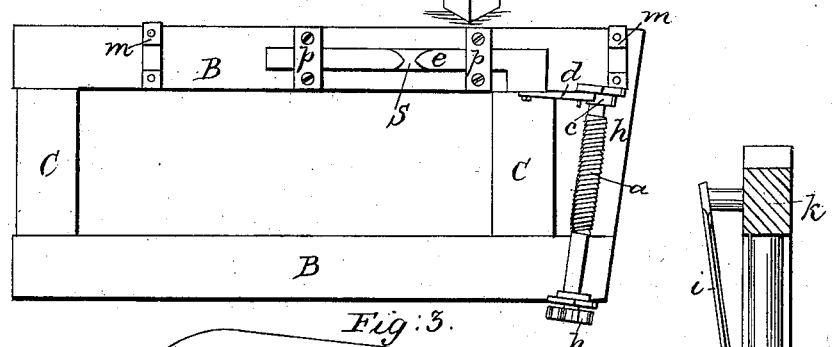
Figure 3:
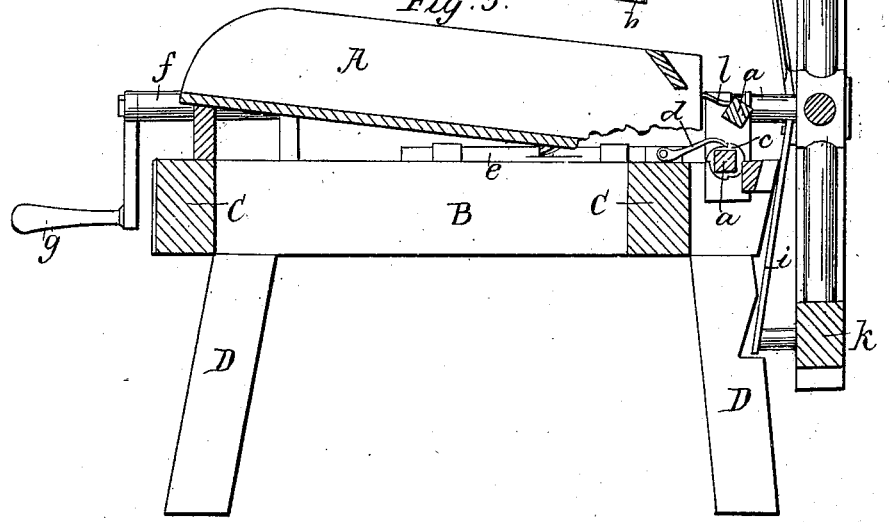

Figure 1, is a perspective view, Fig. 2, is a top view, with some of the parts removed, and Fig. 3, is a vertical longitudinal section.

The same letters refer to corresponding parts in all the figures.

The nature of my invention consists in placing the knives $i$, $i$, upon the driving wheel in an oblique position to the axle thereof and the combining the same with the rest and feeding rollers placed at such an angle with the straw box, as to give to the knives an oblique drawing cut across the fibers of the straw.

A, is the straw box; B, B, are the side pieces, C, C, are the transverse pieces, and D, D, are the posts of the supporting frame of the straw cutter, constructed in the usual manner.

$a$, $a$, are the feeding rollers, the bearings of which are so placed as to give the rollers an angle of twenty or thirty degrees, (more or less,) with the straw box, for the purpose of giving the knives $i$, $i$, an oblique drawing cut upon the straw; the knives $i$, $i$, are secured to the fly wheel $k$. $h$, is the rest over which the straw is cut as it emerges from between the feeding rollers.

$b$, $b$, are pinions on the axles of the feeding rollers, constructed in the usual manner, so as to allow the rollers to recede from, and approach nearer to each other.

$l$, $l$, are springs pressing upon the journals of the upper feeding roller, forcing it down, and giving it a flexible bearing upon the straw as it passes between the rollers.

$c$, is the feeding ratchet wheel, on the end of the lower feeding roller, operated by the pawl $d$; the pawl $d$, is attached to a vibrating bar $e$, working on one of the side pieces B, of the supporting frame, in the bearings $p$, $p$; the bar $e$, is operated by a cam $n$, on the driving shaft $f$, working into the recess $s$.

$m$, $m$, are the bearings of the driving shaft.

The feeding rollers have oblique sharp edged grooves formed in each of their sides, placed in a helical direction with each other, for the purpose of equally distributing the straw between the rollers imparting to it a straight forward motion, parallel to the sides of the straw box, and preventing the straw from crowding to the ends of the rollers, in consequence of the oblique direction given to them. The ratchet wheel $c$, has the same number of teeth, that there are sides to each of the feeding rollers; consequently each forward motion of the pawl $d$, so acts upon the feeding rollers as to bring a side of each together, at the moment that one of the knives $i$, acts upon the straw. The feed of the straw and the length of the cuttings, is therefore regulated by the width of the sides of the feeding rollers.

It is self evident that the giving an oblique drawing cut to the knives upon the straw, will greatly reduce the power required to operate them, when compared with those that cut off the straw at right angles. It is not necessary therefore, to say anything further of the superior merits of my improved straw cutter, as they will be readily perceived and appreciated by all who are interested in such matters.

Having thus fully described to the construction and operation of my improved straw cutter, what I claim therein as new and desire to secure by Letters Patent, is—

The securing the knives $i$, $i$, upon the driving wheel in an oblique position to the axle thereof, and combining the same with the oblique rest and feeding rollers for the purpose of giving a drawing longitudinal cut upon the straw, substantially as herein set forth.

WM. LEWIS.

Witnesses:
Z. C. ROBBINS,
H. DONN.